(12) United States Patent
Patterson (10) Patent No.: US 6,609,219 B1
(45) Date of Patent: Aug. 19, 2003

(54) DATA CORRUPTION TESTING TECHNIQUE FOR A HIERARCHICAL STORAGE SYSTEM

(75) Inventor: Brian L. Patterson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/490,792

(22) Filed: Jan. 24, 2000

(51) Int. Cl.$^7$ ................................................. G06F 11/00
(52) U.S. Cl. ............................ 714/42; 714/33; 702/179
(58) Field of Search ........................... 714/42, 770, 27, 714/33, 41, 47, 26, 25; 369/53.12, 53.17; 711/114; 702/179, 186, 183

(56) References Cited

U.S. PATENT DOCUMENTS

| | | | | |
|---|---|---|---|---|
| 4,775,978 A | | 10/1988 | Hartness | 371/38 |
| 5,392,244 A | * | 2/1995 | Jacobson et al. | 711/114 |
| 5,500,940 A | | 3/1996 | Skeie | 395/183.01 |
| 5,504,858 A | | 4/1996 | Ellis et al. | 395/182.04 |
| 5,572,661 A | | 11/1996 | Jacobson | 395/182.05 |
| 5,581,690 A | | 12/1996 | Ellis et al. | 395/182.04 |
| 5,615,352 A | | 3/1997 | Jacobson et al. | 395/441 |
| 5,621,887 A | * | 4/1997 | Chatterji | 714/23 |
| 5,664,187 A | | 9/1997 | Burkes et al. | 395/621 |
| 5,832,204 A | * | 11/1998 | Apperley et al. | 714/42 |
| 5,835,703 A | * | 11/1998 | Konno | 714/41 |
| 5,857,112 A | * | 1/1999 | Hashemi et al. | 710/8 |
| 5,961,652 A | | 10/1999 | Thompson | 714/6 |
| 6,092,221 A | * | 7/2000 | Hiratsuka | 714/47 |
| 6,138,249 A | * | 10/2000 | Nolet | 714/25 |
| 6,158,017 A | * | 12/2000 | Han et al. | 711/114 |

OTHER PUBLICATIONS

Chen et al. RAID: High–Performance, Reliable Secondary Storage. ACM Computing Surveys, vol. 26, No. 2, Jun. 1994.*

* cited by examiner

*Primary Examiner*—Robert Beausoliel
*Assistant Examiner*—Marc M Duncan (57) ABSTRACT

A storage system is described that includes a controller and a disk array. The disk array includes at least a first and a second storage area. The first storage area is associated with a first mean time to failure (MTTF) and the second storage area is associated with a second MTTF. The controller operates to test the first storage area at a first frequency and the second storage area at a second frequency. The first frequency and the second frequency are each based upon the first and second MTTF so as to optimize the overall reliability of the storage system.

20 Claims, 5 Drawing Sheets t_RAID_5 / t_RAID_1

DATA CORRUPTION TESTING TECHNIQUE FOR A HIERARCHICAL STORAGE SYSTEM

BACKGROUND OF THE INVENTION

Computing systems often include a mass storage system for storing data. One popular type of mass storage system is a "RAID" (redundant arrays of inexpensive disks) storage system. A detailed discussion of RAID systems is found in a book entitled, *The RAID Book: A Source Book for RAID Technology*, published Jun. 9, 1993, by the RAID Advisory Board, Lino Lakes, Minn.

A typical RAID storage system includes a controller and a disk array coupled together via a communication link. The disk array includes multiple magnetic storage disks for storing data. In operation, the controller of a RAID storage system operates to receive Input/Output (I/O) commands from an external host computer. In response to these I/O commands, the controller reads and writes data to the disks in the disk array and coordinates the data transfer between the disk array and the host computer. Depending upon the RAID implementation level, the controller in a RAID system also generates and writes redundant data to the disk array according to a particular data redundancy scheme. The redundant data enables recovery of user data in the event that the data becomes corrupted.

A RAID level one (RAID 1) storage system includes one or more data disks for storing data and an equal number of additional "mirror" disks for storing the redundant data. The redundant data in this case is simply a copy of the data stored in the mirror disks. If data stored in one or more of the data disks becomes corrupted, the mirror disks can then be used to reconstruct the corrupted data. Other RAID levels store redundant data for user data distributed across multiple disks. If data on one disk becomes corrupted, the data in the other disks are used to reconstruct the corrupted data.

Each of the RAID levels is associated with a particular mix of design tradeoffs. For example, a RAID 1 storage system will typically have a higher "mean time to failure" (MTTF) and a higher I/O rate than a RAID 5 storage system. For purposes of this document, the term "failure" refers to the actual loss of data. For example, if a single byte of user data becomes corrupted in a RAID 1 storage system a failure has not occurred as long as the corresponding mirror data can still be used to recover the corrupt data. If, however, the corresponding mirror data also becomes corrupted, a failure has occurred as the data is now unrecoverable. Thus, MTTF can be considered a measure of the risk of data loss.

In order to combine the advantages of more than one data redundancy scheme, hierarchical data storage systems have been developed. Such systems typically include more than one storage area each for storing data according to a particular data redundancy scheme. For example, in a typical hierarchical RAID storage system, data can be stored according to multiple RAID architectures.

One common type of hierarchical RAID storage system includes a RAID 1 storage area and a RAID 5 storage area. Critical data is stored in the RAID 1 storage area to take advantage of the relatively higher MTTF and higher I/O rate. Less critical data is stored in the RAID 5 storage area to take advantage of the lower cost per megabyte characteristics of a RAID 5 data redundancy scheme.

One common function of the controller in a hierarchical RAID storage system is to intermittently test each disk in the system for the presence of data corruption. This serves to increase the MTTF of the storage system as corrupt data that is detected can be recovered before a failure occurs. That is, before data that would be used to recover the corrupt data also becomes corrupted. Historically, these tests were accomplished by testing the data uniformly across the storage system.

SUMMARY OF THE INVENTION

In one embodiment, the invention is implemented as a method of testing a data storage system for corrupt data. The storage system including a first data storage area associated with a first mean time to failure (MTTF) and a second data storage area associated with a second MTTF. The method preferably includes testing the first storage area for a first amount of time and testing the second storage area for a second amount of time. The first amount of time is based at least upon the first MTTF and the second MTTF. Also, the second amount of time is based upon the first MTTF and the second MTTF.

It is noted that the method may be performed within a hierarchical RAID storage system. The first storage area may be for storing data according to a first RAID redundancy scheme and the second storage area may be for storing data according to a second RAID redundancy scheme. The first RAID redundancy scheme may be, for example, a RAID level one redundancy scheme. The second RAID redundancy scheme may be a RAID level five or a RAID level six data redundancy scheme.

In another embodiment, the invention is implemented as a data storage system. The data storage system includes a first data storage area associated with a first MTTF, a second data storage area associated with a second MTTF, and means for testing the first data storage area for data corruption at a first frequency based at least upon the first and second MTTF. In addition, the testing means may further be for testing the second data storage area for data corruption at a second frequency based at least upon the first MTTF and the second MTTF. The first data storage area may be for storing data according to a first data redundancy scheme and the second data storage area may be for storing data according to a second data redundancy scheme. The first data redundancy scheme may be, for example, a RAID level one data redundancy scheme. In addition, the second data redundancy scheme may be, for example, a RAID level five data redundancy scheme or a RAID level six data redundancy scheme.

In yet another embodiment, the invention is implemented as another data storage system. In this case, the data storage system includes a first data storage area associated with a first MTTF, a second data storage area associated with a second MTTF, and a controller operative to receive I/O commands from an external host and to coordinate data transfers between the external host and the first and the second data storage areas. The controller is further operative to test the first storage area for corruption at a first frequency based at least upon the first MTTF and the second MTTF. In addition, the controller may be further operative to test the second storage area at a second frequency based at least upon the first MTTF and the second MTTF. If the first MTTF is less than the second MTTF, the first frequency is higher than the second frequency. The first data storage area may be for storing data according to a RAID level one data redundancy scheme and the second data storage area may be for storing data according to a RAID level five data redundancy scheme or a RAID level six data redundancy scheme.

DETAILED DESCRIPTION OF THE INVENTION

Figure 1:
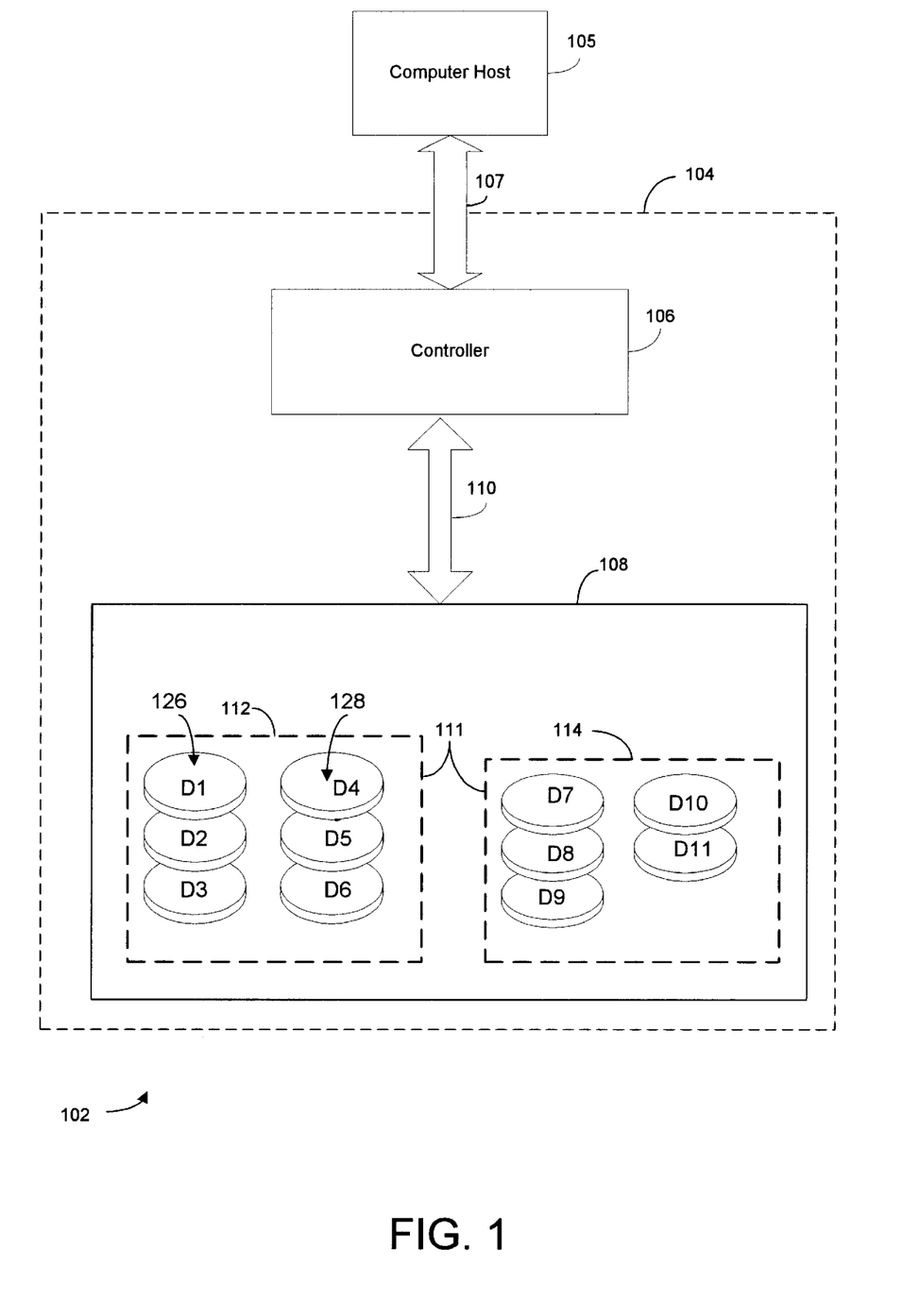
FIG. 1 shows a block diagram of a hierarchical storage system incorporating a first embodiment of the invention.

As shown in FIG. 1, for purposes of the illustration, the invention is embodied in a RAID hierarchical storage system 104. The storage system 104 indudes a controller 106 and a disk array 108. The controller 106 is connected to an external host computer 105 via a first communication link 107 and to the disk array 108 via a second communication link 110. Both of these links may represent any suitable communication path. For example, the first communication link 107 may represent, for example, a local area network (LAN). The second communication link 110 may represent, for example, a small computer system interface (SCSI).

The disk array 108 includes magnetic storage disks (disks) for storing blocks of data in a standard manner. The disks can be conceptualized, for purposes of explanation, as forming a first storage area 112 and a second storage area 114.

The first storage area (RAID 1 storage area) 112 is for storing data according to a RAID 1 data redundancy scheme. The mirror redundancy is diagrammatically represented by the three pairs of disks. User data is stored by the controller 106 onto disks D1–D3 while a copy of the user data is stored onto disks D4–D6. The second storage area (RAID 5 storage area) 114 is for storing data according to a RAID 5 data redundancy scheme. User data is stored onto disks D7–D10 and parity data is stored onto disk D11.

In operation, the controller 106 can perform a number of standard function. These functions may include receiving input/output (I/O) commands from the host computer 105 and coordinating data transfers between the host computer 105 and the two storage areas in response to an I/O command. The controller 106 may further operate to transfer data between the first storage area 112 and the second storage area 114 according to a standard migration policy.

In this embodiment, it is assumed that the controller 106 reads and writes data to each of the storage areas in blocks. Upon writing a data block to a disk, the controller 106 also writes an "error code" (in a standard manner) for the block. For purposes of this document, the phrase "error code" refers to any set of data that can be used to determine if a data block is corrupt. Thus, for example, the error code may be a cyclic redundancy check or a checksum value.

In addition to the functions just mentioned, the controller 106 also performs a data test function. As will be described in greater detail below, the controller 106 performs this function by testing the disk array 108 (block by block) for the presence of data corruption. If corrupt data is found during the test, the controller 106 then operates (if possible) to recover the data using the stored redundant data.

As would be expected, there are constraints placed upon how often and when the data test function is performed. This allows the controller 106 to perform other functions (such as respond to an I/O request). In this embodiment, for example, the data test function is a low priority and interruptible background task that is performed each time the controller 106 enters an idle state. As a result, over a given period of time ("T_period") and under expected conditions, the amount of time spent testing the disk array 108 is assumed to be ("t_test").

For ease of discussion, the amount of time spent testing the RAID 1 storage area 112 during "t_test" is referred to as "t_RAID1". Likewise, the amount of time spent testing the RAID 5 storage area 114 during t_test is referred to as "t_RAID5". Thus, t_test is equal to t_RAID1+t_RAID5.

It is important to note for this discussion that each of the two storage areas is associated with a characteristic MTTF. The value of the MTTF can be a function of a number of factors such as the particular data redundancy scheme and the reliability of the components used in a particular storage area. For ease of discussion, the MTTF of the RAID 1 storage area 112 is referred to as "MTTF (RAID 1)". Likewise, the MTTF of the RAID 5 storage area 114 is referred to as "MTTF (RAID 5)".

In addition, the term "MTTF (system)" is used herein to refer to the MTTF of the disk array 108. Thus, MTTF (system) is an overall measurement of the reliability of the disk array 108. In addition, it can be seen that MTTF (system) is a function of both MTTF (RAID 1) and MTTF (RAID 5).

As would be expected, MTTF (RAID 5) is less than MTTF (RAID 1). Thus, as between the two storage areas, the risk of a failure (i.e., data loss) is greater for data stored in the RAID 5 storage area 114. Accordingly, it can be seen that MTTF (system) can be optimized if t_RAID 5 is increased so as to offset this greater risk of failure. It can also be seen, however, that as t_RAID_5 is increased, the risk of failure becomes greater in the RAID 1 storage area 112 as the amount of time (t_RAID_1) spent testing that area is reduced. Thus, the increased risk of failure in the RAID 1 storage area 112 must be considered if t_RAID_5 is made greater than t_RAID_1.

From the forgoing discussion it can be seen that there exists an optimum set of values of t_RAID_1 and t_RAID_5 that yields an optimum MTTF (system). For ease of discussion, the optimum value of t_RAID_1 is referred to as "t_RAID_1 (optimum)". Likewise, the optimum value of t_RAID_5 is referred to as "t_RAID 5 (optimum)". Importantly, it can be seen that t_RAID_5 (optimum) and t_RAID_1 (optimum) are both functions of MTTF (RAID 1) and MTTF (RAID 5).

Figure 2:
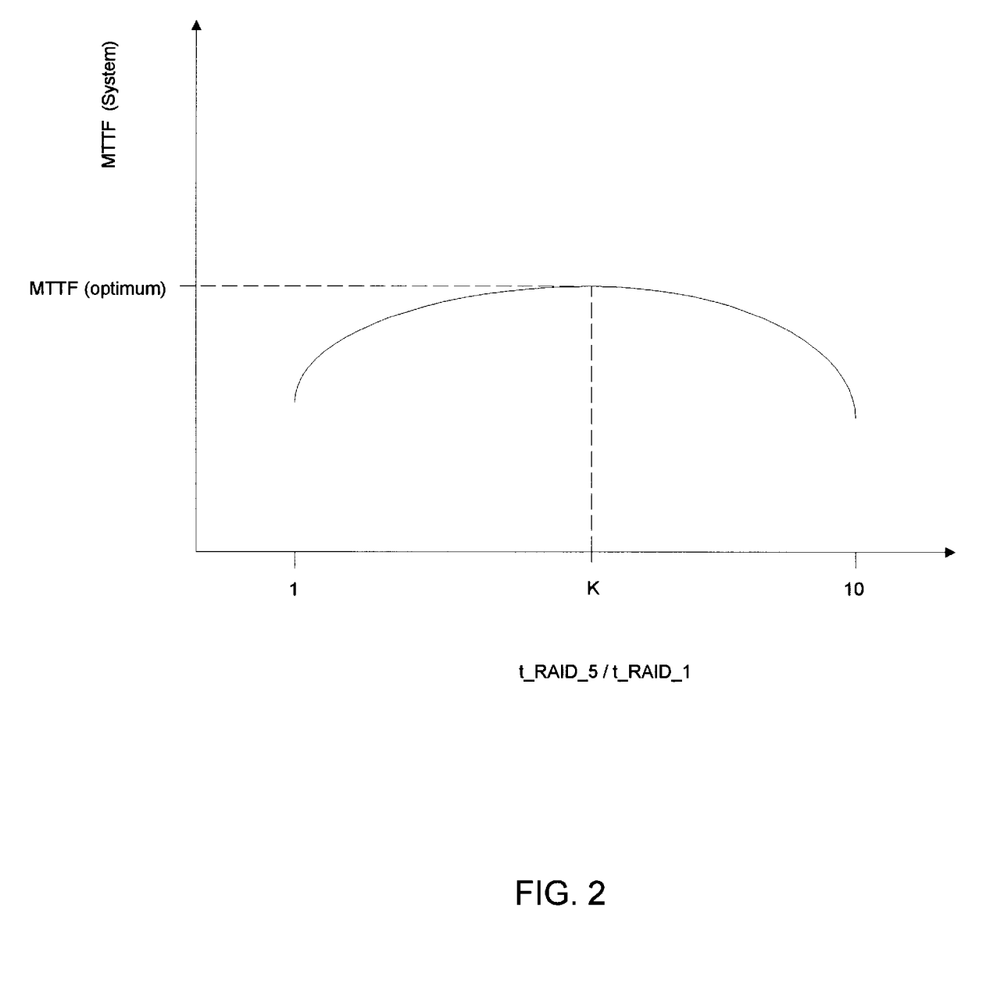
FIG. 2 shows the relationship between MTTF (system) and the ratio of (t_RAID_5)/(t_RAID_1) for the storage system depicted in FIG. 1.

To illustrate this point, FIG. 2 shows the relationship between MTTF (system) and the ratio of (t_RAID_5)/(t_RAID_1) for the current embodiment. As indicated in FIG. 2, an optimized value of MTTF (system) is obtained when (t_RAID_5)/(t_RAID_1)=K. Thus, t_RAID_5 (optimum)=K×t_RAID_1 (optimum).

It is noted that in practice, the value of K may be determined using a standard statistical analysis or by empirical methods or both. This analysis would be based primarily upon the values of MTTF (RAID 1), MTTF (RAID 5) and t_test. Also, it would be expected that K is greater than one in this example since MTTF (RAID 5) is less than MTTF (RAID 1).

According to the principles of the present invention, the controller 106 is adapted to perform the data test function so that, under expected conditions, t_RAID5=K×t_RAID1. As indicated in FIG. 2, this can result in optimizing the value of MTTF (system).

Figure 3:
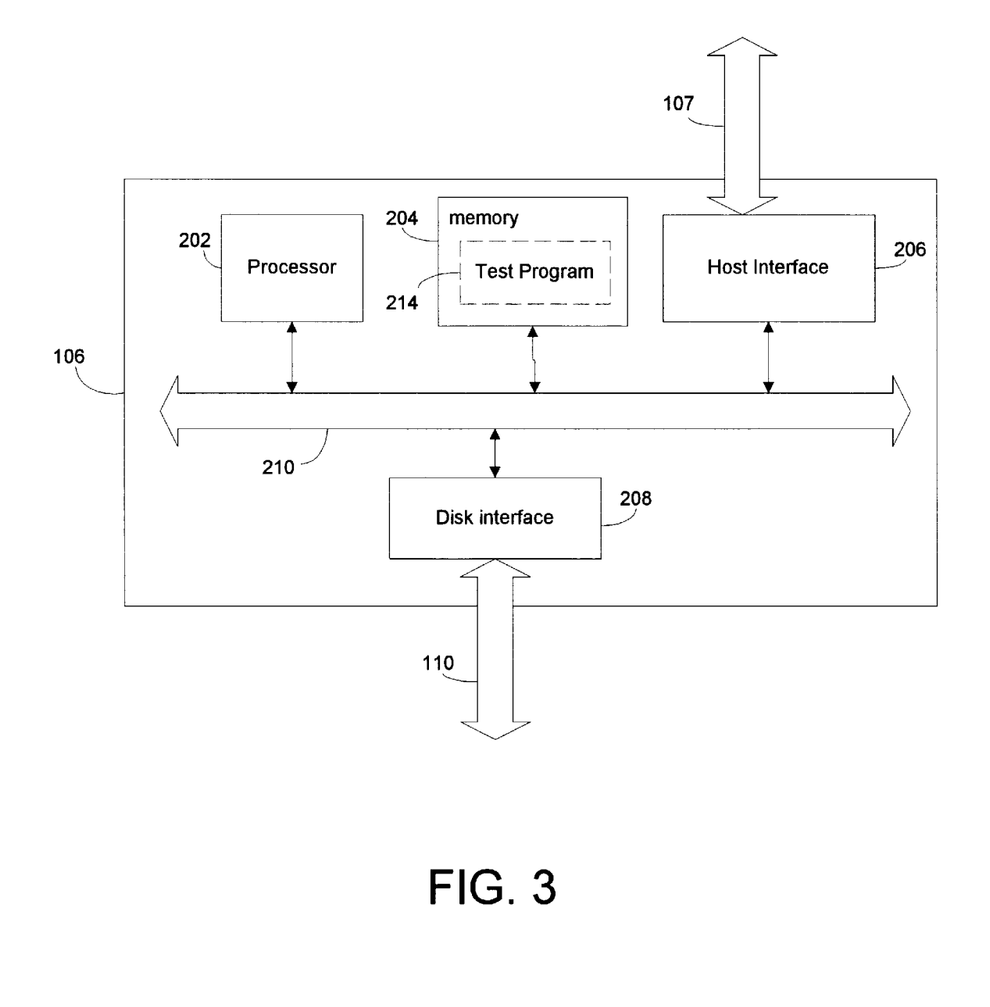
FIG. 3 is high level schematic of a controller for the storage system depicted in FIG. 1.
Figure 4:
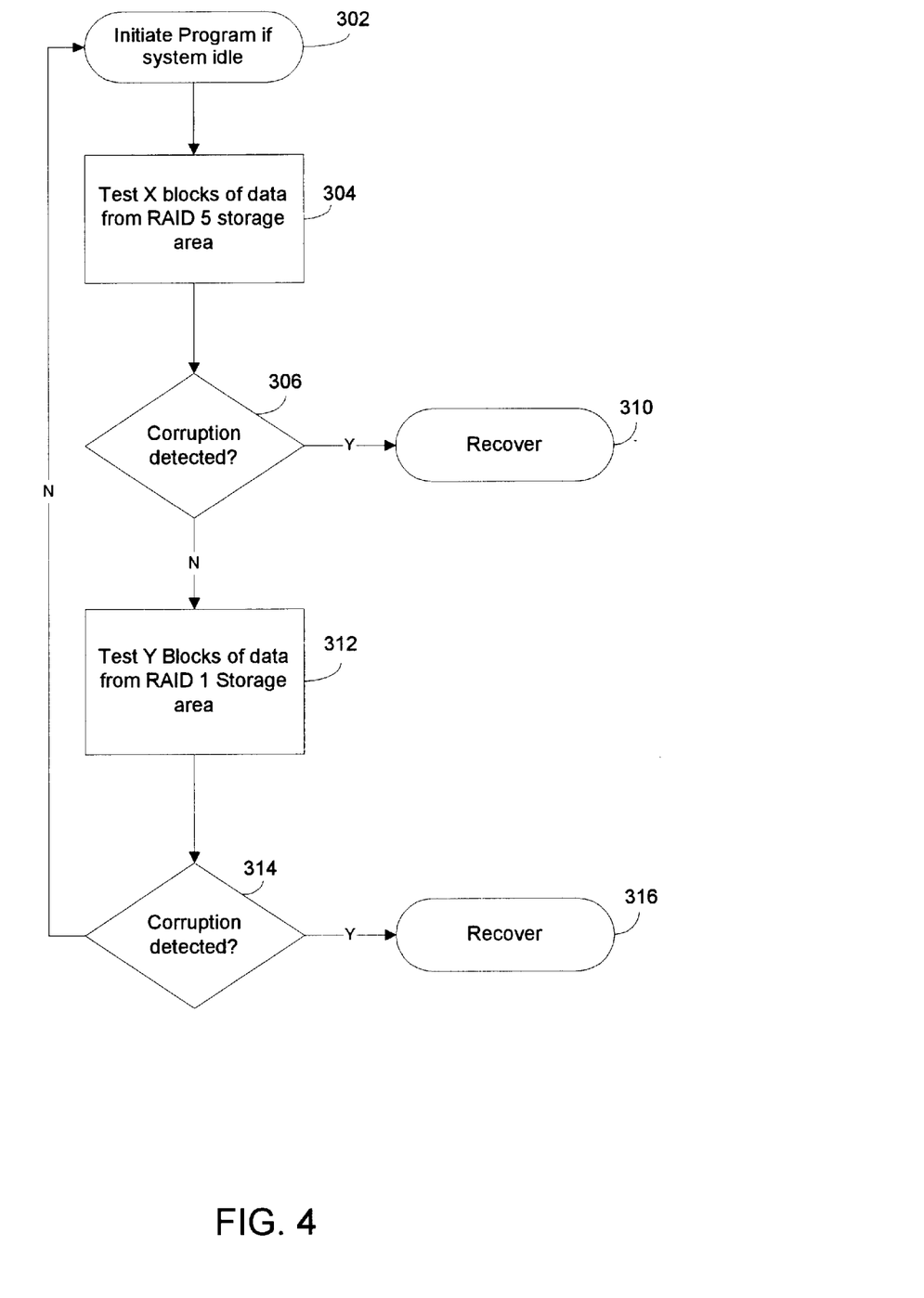
FIG. 4 is a flow diagram to illustrate generally the logic followed by the controller to test each of the two storage areas for data corruption.

To illustrate one example of how the test function could be implemented, reference is made to FIG. 3 and FIG. 4.

FIG. 3 is high level schematic of the controller 106. As shown, the controller 106 includes a processor 202, a memory 204, a host interface 206 and a disk interface 208 all connected via a local bus 210. It is noted that each of these components may in fact include multiple devices. For example, the memory 204 may include one or more read only memories (ROM) and one or more random access memories (RAM). The local bus 210 may include, for example, one or more data buses with accompanying control buses. As shown, the host interface 206 provides the controller 106 with an interface to the host computer 103 (via the first communication link 107). The disk interface 208 provides an interface to the disk array 108 (via the second communication link 110).

The processor 202 operates to execute various firmware programs stored in the memory 204. Many of these programs may be standard and enable the controller 106 to perform the various functions mentioned above. For example, the programs may enable the controller 106 to receive and to process I/O commands received over the host interface 206 and to coordinate the transfer of data between the host computer 103 and the disk array 108 in response to the I/O commands.

Importantly, one of the programs stored in the memory 204 and executed by the processor 202 is a test program 214 that enables the controller 106 the ability to perform the data test function.

In this embodiment, the test program 214 is a background program that is executed automatically by the processor 202 whenever the controller 106 enters an idle state. While the test program 214 is being executed it can be interrupted to allow the controller 106 to perform other functions having a higher priority. For example, assume the controller 106 is presently executing the test program 214 and an I/O command is received from the host computer 103. Upon the I/O command being received, the test program 214 is interrupted to allow the controller 106 to process the I/O command. After the I/O command is processed and assuming there are no higher level functions scheduled to be performed, the execution of the test program 214 resumes.

FIG. 4 is a flow diagram to illustrate generally the logic followed by the controller 106 with the processor 202 operating under the direction of the test program 214.

Referring now to FIG. 4, upon the test program 214 being initiated (step 302) the controller 106 operates to test "X" blocks of data in the RAID 5 storage area 114 to determine if any of the data is corrupt (step 304). In this embodiment, this step is performed by attempting to read each block from the disk array 108. If a particular block cannot be read, the block is determined to be corrupt. If the block can be read, a new error code is computed for the block and then compared to the error code stored for the block. If the two values are not identical, the block is determined to be corrupt. If, however, the two blocks are identical, the block is determined not to be corrupt.

If any of the data blocks tested in step 304 is determined to be corrupt (decision step 306), the controller 106 can then operate, using standard techniques, to recover the corrupt data (step 310). If, however, the data tested is determined not to be corrupt, the controller 106 then tests "Y" blocks of data stored in the RAID 1 storage area 112 in a similar manner as described above (step 312). If any of the "Y" blocks of data tested in step 312 is determined to be corrupt (decision step 314), the controller 106 can then operate, using standard techniques, to recover the corrupt data (step 316).

These steps are repeated so as to progressively test and retest all the data stored in the disk array 108. Importantly, the number of data blocks ("X") tested in step 304 is greater than the amount of data blocks ("Y") tested in step 312. These values area chosen so that the ratio of t_RAID_5/ T_RAID_1 is equal, or approximately equal, to the value K.

From the foregoing, it will be appreciated that a RAID hierarchical storage system provided by the invention employs a novel and advantageous technique for reducing the risk of data loss in the system. It is also important to note that the present invention can be used to improve the reliability of other types of storage systems.

Figure 5:
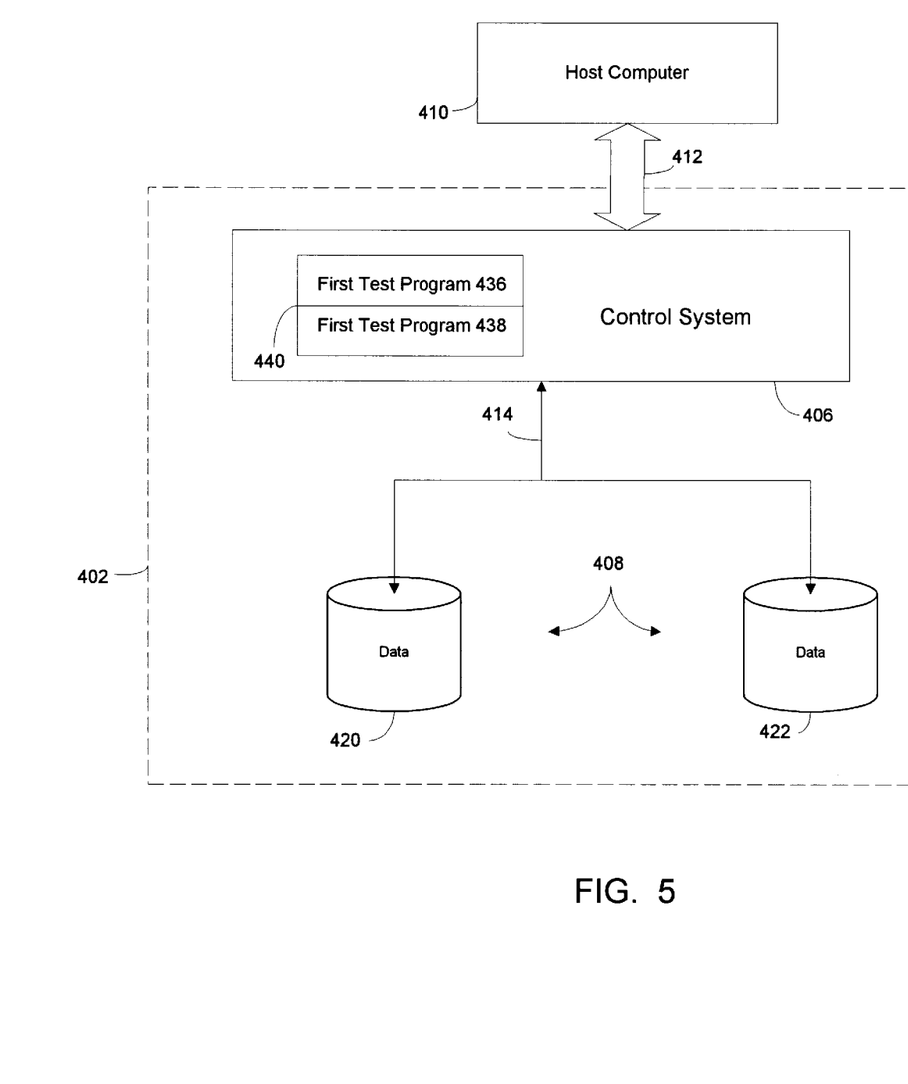
FIG. 5 shows a block diagram of a second data storage system incorporating a second embodiment of the invention.

To illustrate the applicability of the present invention to other types of storage systems FIG. 5 shows a block diagram of a second data storage system 402. In this embodiment, the storage system includes a controller 406 and multiple storage areas 408. The controller 406 is connected to an external host computer 410 via a first communication link 412 and to the multiple storage areas 408 via a second communication link 414. In this example, the multiple storage areas 408 include a first storage area 420, and a second storage area 422. Each storage area is associated with a characteristic MTTF. The value of the MTTF may be based upon a number of factors including the data redundancy scheme used and the reliability of the components that make up the storage area. The first storage area 420 may represent, for example, an array of tape storage devices for storing data according to a first data redundancy scheme. The second storage area 422 may represent, for example, a disk array for storing data according to a second data redundancy scheme.

For ease of discussion, the MTTF associated with the first storage area 420 is referred to as "MTTF (FIRST_AREA)". The MTTF associated with the second storage area 422 is referred to as "MTTF (SECOND_AREA)". In this embodiment it is assumed that MTTF (FIRST_AREA) is less than MTTF (SECOND_AREA).

In operation, the controller 406 can perform a number of functions such as receive and process input/output (I/O) commands from the host computer 410. In response to these commands, the controller 406 can read and write data to the multiple storage areas 408.

In addition, the controller 406 also performs a data test function by testing each of the two storage areas for the presence of corrupt data. If, during a test, corrupt data is detected the data can be recovered (if possible) by using standard techniques.

Similar to the first embodiment, there are constraints placed on how often and when the data test function is performed. This allows the controller 406 to perform other functions (such as respond to an I/O request). As a result of these constraints it has been determined that over a given period of time ("T_period") and under expected conditions, the amount of time spent testing the multiple storage areas 408 for corruption is some limited value. This limited value is referred to as "t_test".

According to the principles of the present invention, the controller 406 operates to perform the data test function so that during a given "T_period", the data stored in the first storage area 420 is tested, on average, more frequently than the second storage area 422. For purposes of this document, the frequency at which the first storage area 420 is tested is referred to as "F_1". Likewise, the frequency at which the second storage area 422 is tested is referred to as "F_2". Importantly, F_1 and F_2 are chosen so that MTTF (system) is optimized. It can be seen that F_1 and F_2 can be determined using a standard statistical analysis. Also, the value of F_1 and F_2 will be based primarily on the value of MTTF (first area), MTTF (second area) and "t_test".

It is noted that the data test function may be implemented by a first test program 436 and a second test program 438 which is stored in an internal memory 440. The first test program 436 directs the controller 406 to test the first storage area 420 for corruption. In addition, the second test program 438 directs the controller 406 to test the second storage area 422 for corruption. If corruption is detected during either test, the corrupt data can be recovered using standard techniques.

Each of the two programs may be a background program having a pre-determined level of priority. In addition, each of these programs are scheduled to be executed at different times. The priority levels and execution times are chosen so that under expected conditions the first storage area 420 is tested at a frequency of "F_1". In addition, the second storage area 422 is tested at a frequency of "F_2".

As a result, under expected conditions, MTTF (system) will be optimized. Accordingly, system reliability is improved as compared to similar prior art storage systems.

It is noted that in the embodiments described above, the storage systems were described having two storage areas each associated with a different MTTF. It can be seen, however, the present invention can be used to improve the reliability of storage systems having more than two storage areas. For example, assume the embodiment depicted in FIG. 5 includes a third storage area associated with a third MTTF. This third MTTF is referred to herein as "MTTF (third area)". In this case, the value of "F_1", "F_2" and "F_3" is preferably based upon MTTF (first area), MTTF (second area) MTTF (third area), and t_test. Wherein F_3 is the frequency at which the third area is tested.

It is also noted that in the embodiments described above, the functionality provided by the test program may in actuality be provided by more than one program stored in one or more memory devices. Alternatively, the functionality may also be provided, in whole or in part, by hardware components. For example, one or more of the steps illustrated in FIG. 3 could be performed (the following is a non-exhaustive list) by operation of an application specific integrated circuit (ASIC), a programmable gate array (PGA) or a field programmable gate array (FPGA) or by some combination thereof.

In addition, the present invention may also be embodied as a computer useable medium having computer readable program code embodied therein for causing a computer to perform one or more of the steps depicted in FIG. 3. In the context of this document, "computer useable medium" can be any means that contain, store, propagate or otherwise transport the program for use by or in connection with an instruction execution system, apparatus or device. The computer useable medium can be, for example (the following is a non-exhausting list), a magnetic, optical or a semiconductor-based storage device (e.g., the memory 304 depicted in FIG. 3).

While various embodiments of the present invention have been described above, it should be understood that they have been presented by way of example only, and are not intended to be limiting. For example, the present invention can be used to improve many different types of storage systems. For example, the present invention can be used to improve storage systems that store data according to more than two data redundancy schemes. Thus, the breath and scope of the present invention should not be limited by any of the above described exemplary embodiments, but should be defined only in accordance with the following claims and their equivalents.

What is claimed is:

1. A method of testing a data storage system for corrupt data, the system including a first data storage area associated with a first mean time to failure (MTTF) and a second data storage area associated with a second MTTF, the method comprising:

(a) testing the first storage area for a first amount of time;

(b) testing the second storage area for a second amount of time;

(c) wherein the first amount of time is calculated using the first MTTF.

2. The method of claim 1, wherein the first amount of time is calculated by also using the second MTTF.

3. The method of claim 2, wherein the second amount of time is calculated using the first MTTF.

4. The method of claim 3, wherein the second amount of time is calculated using the second MTTF.

5. The method of claim 4, wherein the data storage system is a hierarchical RAID storage system and the first storage area is for storing data according to a first RAID redundancy scheme and the second storage area is for storing data according to a second RAID redundancy scheme.

6. The method of claim 5, wherein the first RAID redundancy scheme is a Raid level one redundancy scheme.

7. The method of claim 6, wherein the second RAID redundancy scheme is a Raid level five redundancy scheme.

8. A data storage system, comprising:

(a) a first data storage area associated with a first MTTF;

(b) a second data storage area associated with a second MTTF; and (c) means for testing the first data storage area for data corruption at a first frequency;

(d) wherein the first frequency is a precalculated value; and (e) wherein the first frequency is pre-calculated using the second MTTF.

9. The data storage system of claim 8, wherein the first frequency is precalculated using both the second MTTF and the first MTTF.

10. The data storage system of claim 9, wherein the testing means is further for testing the second data storage area for data corruption at a second frequency; and wherein the second frequency is a pre-calculated value;

wherein the second frequency is precalculated using the first MTTF.

11. The data storage system of claim 10, wherein the second frequency is pre-calculated using both the first MTTF and the second MTTF.

12. The data storage system of claim 11, wherein the second frequency is less than the first frequency if the first MTTF is less than the second MTTF.

13. The data storage system of claim 12, wherein the first data storage area is for storing data according to a first data redundancy scheme and the second data storage area is for storing data according to a second data redundancy scheme.

14. The data storage system of claim 13, wherein the first data redundancy is a RAID level one data redundancy scheme.

15. The data storage system according to claim 14, wherein the second data redundancy is a RAID level five data redundancy scheme.

16. The data storage system of claim 14, wherein the second data redundancy scheme is a RAID level six data redundancy scheme.

17. A data storage system, comprising:
(a) a first data storage area associated with a first MTTF;
(b) a second data storage area associated with a second MTTF;
(c) a controller operative to receive I/O commands from an external host and to coordinate data transfers between the external host and the first and the second data storage areas; and
(d) wherein the controller is further operative to test the first storage area for corruption at a first pre-defined frequency;
(e) wherein the first pre-defined frequency is calculated using the first MTTF and the second MTTF.

18. The data storage system of claim 17, wherein the controller being further operative to test the second storage area at a second pre-defined frequency;
   wherein the second pre-defined frequency is calculated using the first MTTF and the second MTTF.

19. The data storage system of claim 18, wherein if the first MTTF is less than the second MTTF, the first frequency is higher than the second frequency.

20. The data storage system of claim 19, wherein the first data storage area is for storing data according to a RAID level one data redundancy scheme and the second data storage area is for storing data according to a RAID level five data redundancy scheme.

* * * * *